(12) United States Patent
Nagata

(10) Patent No.: US 6,493,515 B2
(45) Date of Patent: Dec. 10, 2002

(54) CAMERA

(75) Inventor: Kazuaki Nagata, Saitama (JP)

(73) Assignee: Fuji Photo Optical Co., Ltd., Saitama (JP)

(*) Notice: Subject to any disclaimer, the term of this patent is extended or adjusted under 35 U.S.C. 154(b) by 0 days.

(21) Appl. No.: 09/950,791

(22) Filed: Sep. 13, 2001

(65) Prior Publication Data

US 2002/0031355 A1 Mar. 14, 2002

(30) Foreign Application Priority Data

Sep. 13, 2000 (JP) ........................................ 2000-278147

(51) Int. Cl.⁷ ................................................ G03B 17/02
(52) U.S. Cl. ......................................................... 396/535
(58) Field of Search ........................................ 396/535

(56) References Cited

U.S. PATENT DOCUMENTS 5,697,005 A * 12/1997 Kikuchi ..................... 396/535
5,708,898 A * 1/1998 Manabe et al. ............. 396/535
5,974,264 A * 10/1999 Manabe et al. ............. 396/535
6,058,274 A   5/2000 Omiya ....................... 396/535

FOREIGN PATENT DOCUMENTS

JP       A086134       1/1996

* cited by examiner

*Primary Examiner*—David M. Gray
(74) *Attorney, Agent, or Firm*—Birch, Stewart, Kolasch & Birch, LLP

(57) ABSTRACT

The camera has an appearance quality highly maintained, by crushing a joining portion of a metal cover. A metal cover is crushed at a joining portion to a grip cover, and the grip cover is joined so as to be superposed on the crushed portion. Thus, exposure of an inner structure from the joining portion between the metal cover and grip cover to degrade an appearance quality can be prevented.

6 Claims, 8 Drawing Sheets

CAMERA

BACKGROUND OF THE INVENTION

1. Field of the Invention

The present invention relates to a camera, and more particularly, to a camera whose outer cover at least partly comprises a metal cover formed by machining a plate.

2. Description of the Related Art

Generally, an outer cover of a camera is dividably formed in view of convenience in assembly, and a plurality of covers are adapted to be joined to constitute one outer cover. However, when the plurality of covers are joined to constitute one outer cover, clearances are generated at joining portions, so that there is a disadvantage of degrading an appearance quality. For this reason, in a camera disclosed in Japanese Patent Application Publication No. 8-6134, a raised portion is formed on a joining portion of one cover, and the raised portion is superposed on a joining portion of the other cover to prevent generation of the clearance at the joining portion.

However, in the method disclosed in Japanese Patent Application Publication No. 8-6134, the raised portion must be formed on the joining portion, thus there are disadvantages of troublesome machining and a constrained design of an appearance.

U.S. Pat. No. 6,058,274 discloses an outer covering may be configured in such a manner that the whole outer covering is made from plastic and that a metal cover formed by machining a metal plate is mounted to part thereof.

SUMMARY OF THE INVENTION

The present invention is made in view of the above circumstances and has its object to provide a camera which has an appearance quality highly maintained.

In order to achieve the above object, the present invention is directed to a camera whose outer cover at least partly comprises a metal cover formed by machining a plate, wherein the metal cover is configured in such a manner that a portion which is to be a joining portion to another cover constituting the outer cover is crushed and then surface treated, and that a portion with a thickness reduced by the crushing is cut.

According to the present invention, for the metal cover, the joining portion is crushed and then surface treated, and the portion with the thickness reduced by the crushing is cut. Thus, even when a clearance is generated at the joining portion, exposure of a component inside the cover can be prevented. Further, a treated end surface of the metal cover is exposed from the clearance, thus an appearance quality is not degraded.

Preferably, a cut end surface of the metal cover is matted. Hence, even when the cut end surface is exposed at the appearance after assembly, generation of reflection or the like can be prevented, thus degrading the appearance quality can be prevented.

More preferably, a cut end surface of the metal cover is coated with matting paint by stamping. Matting by stamping allows the matting paint to be surely and easily applied to the cut end surface only.

Preferably, a surface of a member positioned inside the joining portion of each cover constituting the outer cover is matted. Hence, even when the clearance is generated at the joining portion, reflection of an inner structure from the clearance can be prevented, thus degrading the appearance quality can be prevented.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

A preferred embodiment of a camera according to the present invention will be described below with reference to the drawings.

Figure 1:
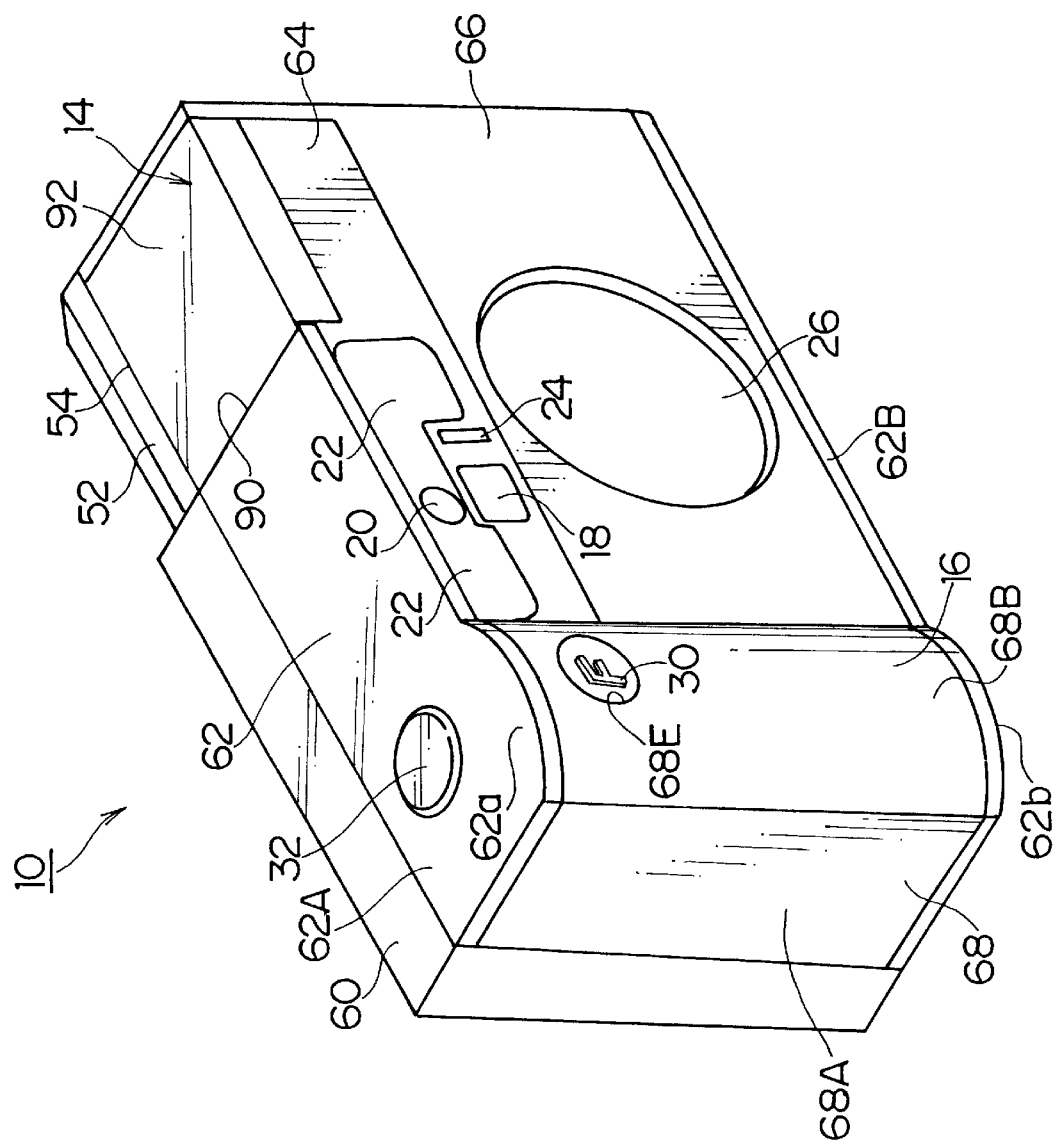
FIG. 1 is a front perspective view of an appearance of a camera according to an embodiment of the present invention.
Figure 2:
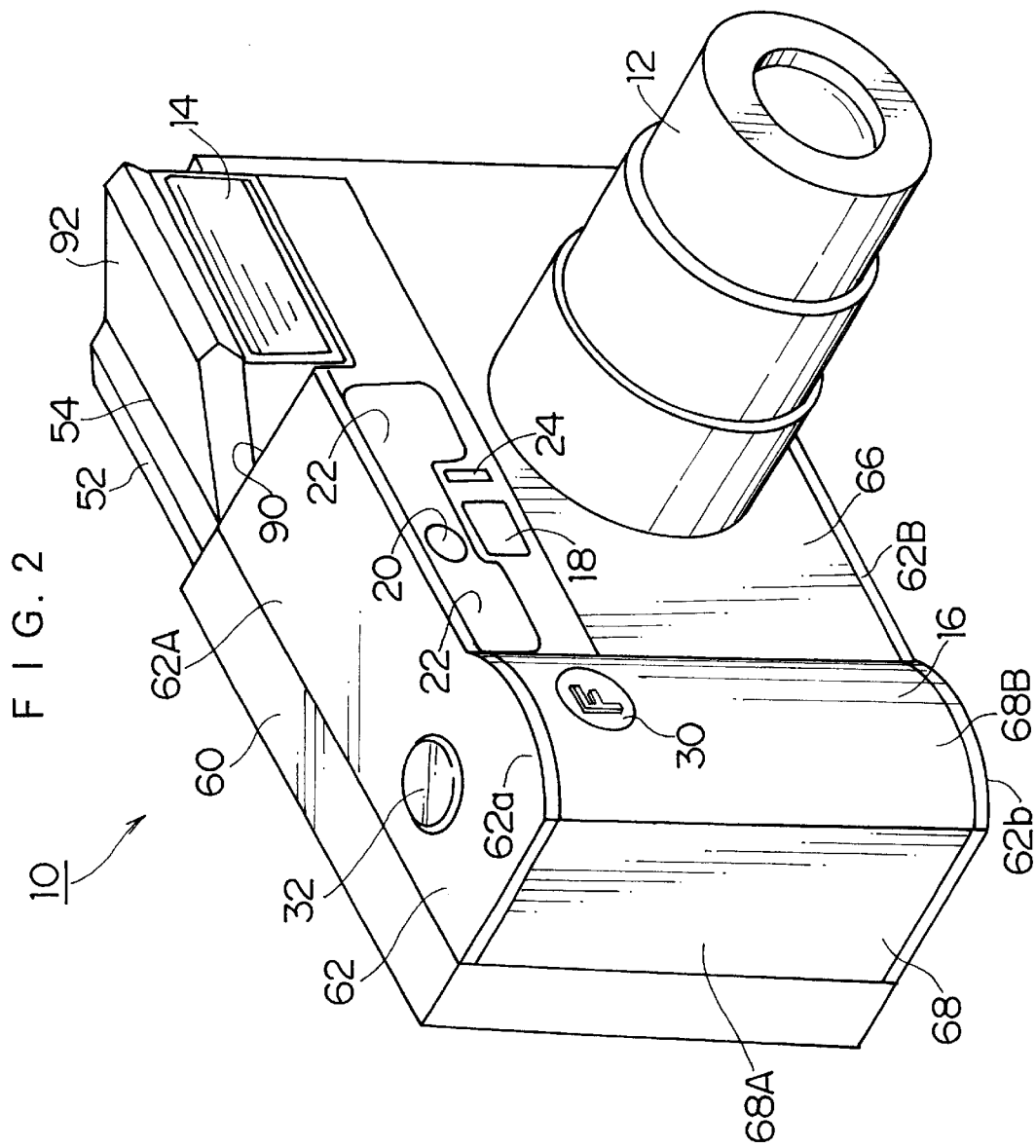
FIG. 2 is a front perspective view of the appearance of the camera according to the embodiment.

FIGS. 1 and 2, respectively are front perspective views of appearances of a camera according to this embodiment. A camera 10 shown in the figure is an APS camera and is provided, on its front surface, with a lens barrel 12, electronic flash 14, grip 16, finder window 18, AE light receiving window 20, AF windows 22, 22 and self-timer lamp 24.

The lens barrel 12 is provided substantially in the center of the front surface of the camera 10 and has a zoom function. The lens barrel 12 is of the collapsible barrel type and is extended when the camera 10 is switched on, and collapsed when the camera 10 is switched off. When the lens barrel 12 is collapsed, the front surface of the camera 10 becomes flattened, and a lens barrier 26 is shut in front of the collapsed lens barrel 12.

The electronic flash 14 is provided on an upper right corner of the front surface of the camera 10. The electronic flash 14 is of the pop-up type and is pivoted and raised up when the camera 10 is switched on, and accommodated in a camera body when the camera 10 is switched off.

The grip 16 is formed with a predetermined width on a left edge of the front surface of the camera 10. The grip 16 is formed with a forward arcuate bulge, and around a top end of the front surface, a circular nameplate 30 is provided. Further, a shutter button 32 is provided on a top surface of the grip 16, and an unshown cartridge cap is provided on a bottom surface of the grip 16.

The finder window 18 is provided above the lens barrel 12, and the AE light receiving window 20 is provided above the finder window 18. The AF windows 22, 22 are provided so as to sandwich the AE light receiving window 20, and the self-timer lamp 24 is provided on the right of the finder window 18.

Figure 3:
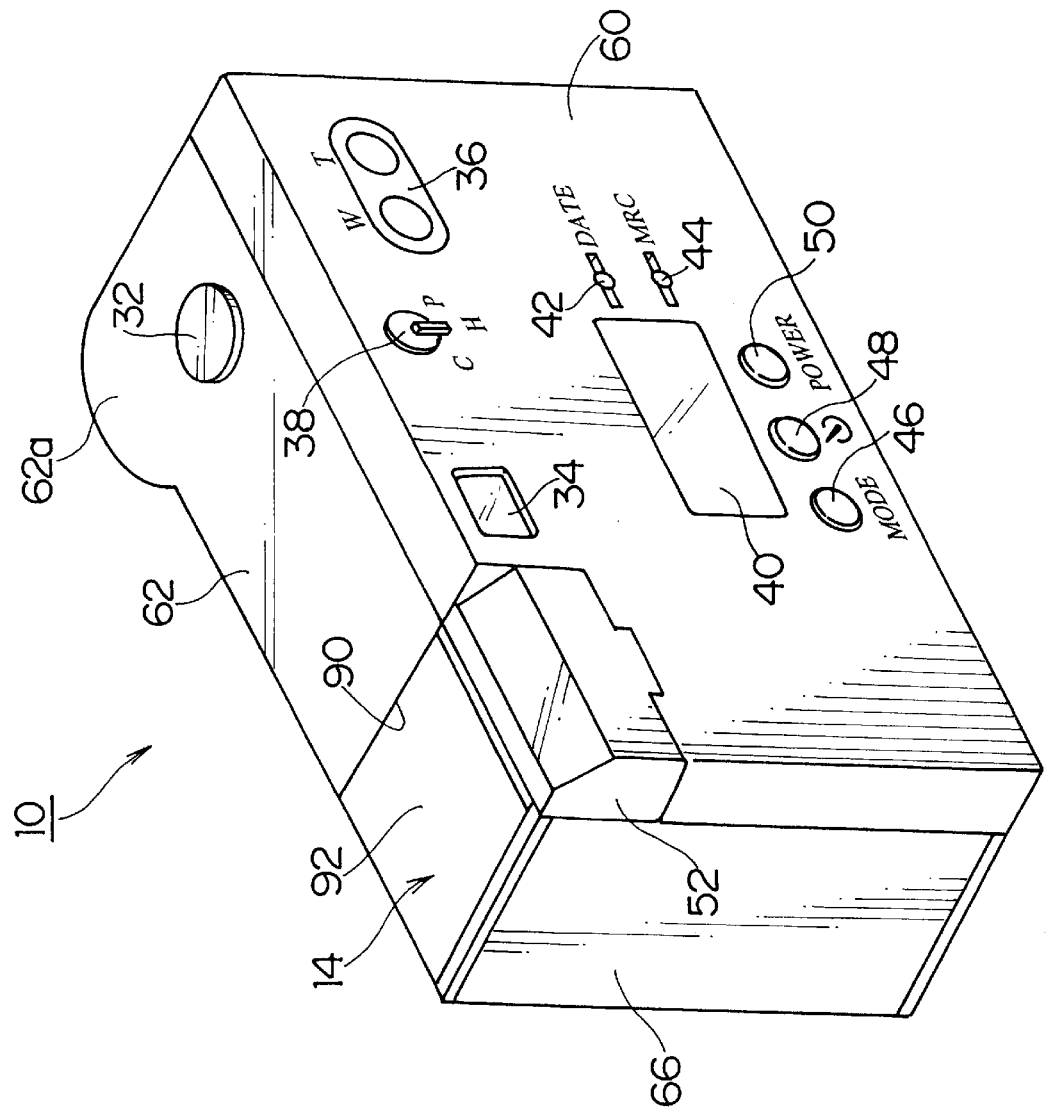
FIG. 3 is a back perspective view of the appearance of the camera according to the embodiment.

FIG. 3 is a back perspective view of the appearance of the camera according to this embodiment. As shown in the figure, provided on a back surface of the camera 10 are a finder ocular window 34, zoom lever 36, print type switching knob 38, liquid crystal panel 40, date button 42, MRC button 44, mode button 46, self-timer button 48, power button 50 and battery cap 52.

The zoom lever 36 is provided on an upper right corner of the back surface of the camera 10, and by operating the zoom lever 36, zooming is carried out.

The print type switching knob 38 is provided on a left side of the zoom lever 36, and by operating the print type switching knob 38, print types are switched among a standard type (C), high vision type (H) and panorama type (P).

The liquid crystal panel 40 is formed in a rectangular shape and provided substantially in the center of the back surface of the camera body. Displayed on the liquid crystal panel 40 are the number of exposures, taking mode, cartridge mark, self-timer mode, battery capacity, date, kinds of film, sensitivity of film, or the like.

The date button 42 is disposed on the right of the liquid crystal panel 40, and by operating the date button 42, writing of the date is selected. The MRC button 44 is similarly disposed on the right of the liquid crystal panel 40, and by operating the MRC button 44, halfway replacement of the film is selected.

The mode button 46, self-timer button 48, and power button 50 are disposed in parallel below the liquid crystal panel 40. By operating the mode button 46, the taking mode is selected, and by operating the self-timer button 48, the self-timer function is selected. By operating the power button 50, the camera 10 is switched on/off.

The battery cap 52 is disposed backward of the electronic flash 14, and pivoted via a hinge to be opened/closed. At this time, the battery cap 52 is opened/closed by hooking a nail or the like onto a clearance 54 formed between the battery cap 52 and electronic flash 14.

Figure 4:
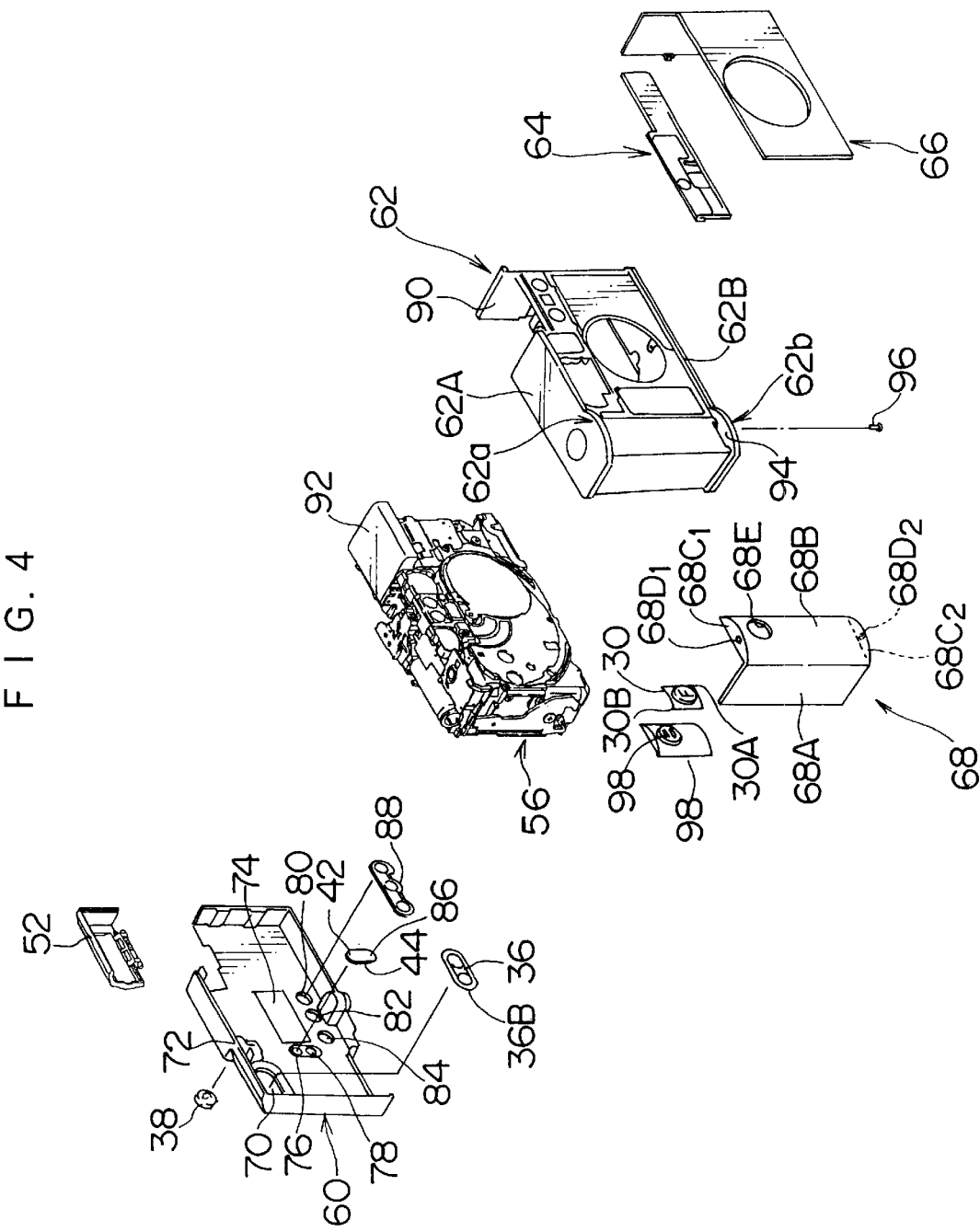
FIG. 4 is an exploded perspective view of the camera according to the embodiment.

FIG. 4 is an exploded perspective view of the camera according to this embodiment. As shown in the figure, an outer cover which covers a camera body 56 mainly comprises a rear cover 60, front cover 62, acrylic cover 64, metal cover 66 and grip cover 68.

The rear cover 60 is formed from synthetic resin and mounted to a back surface of the camera body 56. Formed on the rear cover 60 are an opening for zoom lever 70, opening for print type switching knob 72, opening for liquid crystal panel 74, opening for date button 76, opening for MRC button 78, opening for mode button 80, opening for self-timer button 82 and opening for power button 84. Various kinds of buttons disposed on the back surface of the camera 10 are adapted to be fitted in respective corresponding openings. That is, the zoom lever 36 is adapted to be fitted in the opening for zoom lever 70; the print type switching knob 38, in the opening for print type switching knob 72; the liquid crystal panel 40, in the opening for liquid crystal panel 74; the date button 42, in the opening for date button 76; the MRC button 44, in the opening for MRC button 78; the mode button 46, in the opening for mode button 80; the self-timer button 48, in the opening for self-timer button 82; and the power button 50, in the opening for power button 84.

Both of the date button 42 and MRC button 44 are formed from rubber and integrally formed with a predetermined space on a base member 86. For this reason, mounting of the date button 42 and MRC button 44 to the rear cover 60 is carried out by fitting the integrated date button 42 and MRC button 44 in the opening for date button 76 and opening for MRC button 78, respectively, from inside the rear cover 60.

For the integral piece of the date button 42 and MRC button 44 thus mounted, the date button 42 and MRC button 44 only project from the opening for date button 76 and opening for MRC button 78 to be exposed on an outer surface of the rear cover 60.

The mode button 46, self-timer button 48, power button 50 are similarly formed form rubber and integrally formed with a predetermined space on a base member 88. For this reason, mounting of the mode button 46, self-timer button 48 and power button 50 to the rear cover 60 is carried out by fitting the integrated mode button 46, self-timer button 48 and power button 50 in the opening for mode button 80, opening for self-timer button 82 and opening for power button 84, respectively, from inside the rear cover 60. For the integral piece of the mode button 46, self-timer button 48 and power button 50 thus mounted, the mode button 46, self-timer button 48 and power button 50 only project from the opening for mode button 80, opening for self-timer button 82 and opening for power button 84 to be exposed on the outer surface of the rear cover 60.

The zoom lever 36 is formed with a flange 36B at its outer peripheral edge, and when the zoom lever 36 is mounted to the opening for zoom lever 70 from inside the rear cover 60, the zoom lever 36 only projects from the opening for zoom lever 70 to be exposed on the outer surface of the rear cover 60.

Now, when the rear cover 60 mounted with various kinds of operation buttons or the like as described above is mounted to the camera body 56, the outer surface of the rear cover 60 as it is constitutes an appearance of the camera 10. For this reason, the outer surface of the rear cover 60 is matted. More specifically, the outer surface of the rear cover 60 is coated with rubber.

On the other hand, for the various kinds of operation buttons provided on the outer surface of the rear cover 60 which is thus matted, their respective surfaces are treated to be smooth. That is, the outer surfaces of the zoom lever 36, mode button 46, self-timer button 48 and power button 50 are treated to be smooth.

As described above, the mode button 46, self-timer button 48, power button 50 are integrally formed on the base member 88, and the integral piece is treated to be smooth at portions appearing on the outer surface of the rear cover 60 only, that is, the buttons only. Similarly, the zoom lever 36 is treated to be smooth at portions appearing on the outer surface of the rear cover 60 only, that is, the buttons only.

The integral piece of the mode button 46, self-timer button 48, power button 50 is molded by pouring rubber into a predetermined mold, and at this time, by polishing portions of the mold corresponding to the buttons, the buttons only of the molded integral piece can be treated to be smooth.

The front cover 62 is formed from synthetic resin similarly to the rear cover 60 and mounted to the front surface of the camera body 56. Then, the front cover 62 is mounted with the acrylic cover 64, metal cover 66, and grip cover 68. That is, a top surface 62A and bottom surface 62B only of the front cover 62 constitute the appearance of the camera 10, and front and both side surfaces thereof are covered with the metal cover 66 or the like. The top surface 62A and bottom surface 62B of the front cover 62 are coated with rubber and matted similarly to the rear cover 60.

An electronic flash opening 90 is formed on a right corner of the front cover 62, and an electronic flash cover 92 of the electronic flash 14 provided in the camera body 56 is fitted in the electronic flash opening 90. The electronic flash cover 92 is formed from synthetic resin, and its outer surface is coated with rubber and matted similarly to the front cover 62.

The metal cover 66 is formed by machining an aluminum plate to be of L shape, and its surface is anodized. The metal cover 66 is mounted so as to surround the front and right side surfaces of the front cover 62.

The front cover 62 to which the metal cover 66 is mounted is formed in such a manner that the top surface 62A and bottom surface 62B project by a predetermined amount from the front and both side surfaces. The metal cover 66 is mounted so as to be fitted in a recess formed between the top surface 62A and bottom surface 62B of the front cover 62.

The metal cover 66 is secured to the front cover 62 by a double-faced adhesive tape or an adhesive.

The grip cover 68 is similarly formed by machining an aluminum plate, and its surface is anodized. The grip cover 68 is constituted by a side portion 68A and grip portion 68B and mounted so as to surround a left side portion and front grip portion of the front cover 62.

The side portion 68A is formed in the shape of a rectangular plate, and the left side of the front cover 62 is covered with the side portion 68A.

On the other hand, the grip portion 68B is formed in an arcuate shape, and at the top and bottom thereof, crescent mounting portions $68C_1$, $68C_2$ are respectively formed. The mounting portions $68C_1$, $68C_2$ are integrally molded with the top and bottom, respectively of the grip portion 68B by drawing, and in their center, mounting holes $68D_1$, $68D_2$ are respectively formed.

The front cover 62 to which the grip cover 68 is mounted is formed, at its top surface 62A, with a protruding portion 62a in an arcuate shape, and an unshown positioning pin is formed in a projecting manner on a lower surface of the protruding portion 62a. When the grip cover 68 is mounted to the front cover 62, the positioning pin is fitted in the mounting hole $68D_1$ formed in the upper mounting portion $68C_1$ or the grip cover 68. This allows the grip cover 68 to be correctly mounted to a normal position.

The front cover 62 is also formed, at its bottom surface 62B, with a similar arcuate protruding portion 62b, and a screw hole 94 is formed in the protruding portion 62b. When the grip cover 68 is mounted to the front cover 62 as described above, the mounting hole $68D_2$ formed in the lower mounting portion $68C_2$ of the grip cover 68 is matched with the position of the screw hole 94. A screw 96 is screwed in the screw hole 94 from the bottom surface side of the front cover 62, which secures the grip cover 68 mounted to the front cover 62 to the front cover 62.

The grip portion 68B of the grip cover 68 is formed with a circular nameplate mounting hole 68E, and the nameplate 30 is mounted to the nameplate mounting hole 68E via a mounting plate 98.

Figure 5:
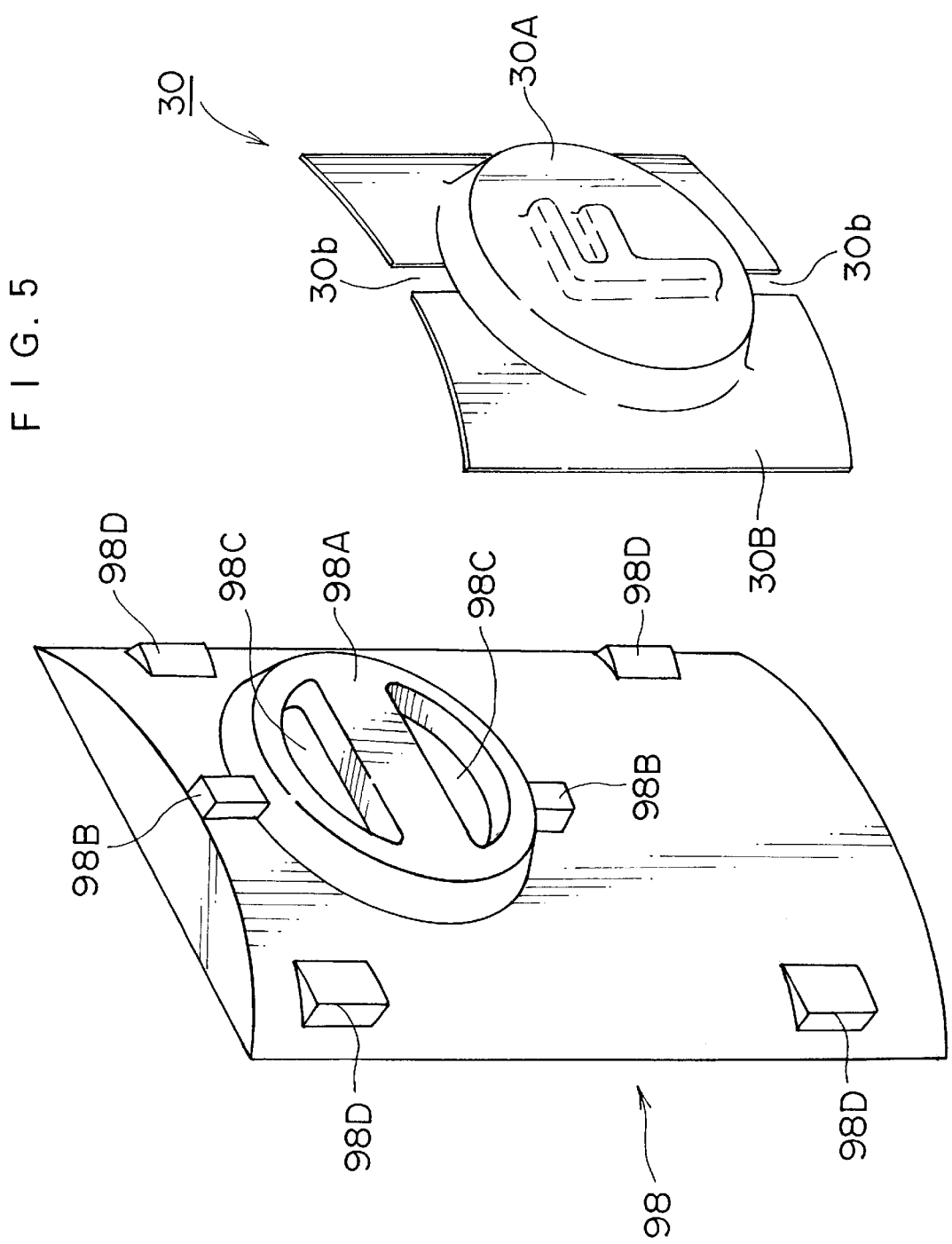
FIG. 5 is a perspective view of a configuration of a nameplate.

A surface of the mounting plate 98 for mounting the nameplate 30 is, as shown in FIG. 5, formed in an arcuate shape along the shape of the grip portion 68B and has a mounting portion 98A in a disk shape around the top.

On the other hand, the nameplate 30 is formed by electroforming, and as a whole, formed so as to be curved in an arcuate shape along the shape of the grip portion 68B. The nameplate 30 comprises a nameplate portion 30A in a disk shape and a flange 30B, and is mounted to the mounting plate 98 by fitting the nameplate portion 30A to the mounting portion 98A of the mounting plate 98. That is, the nameplate portion 30A of the nameplate 30 is formed, in an embossed manner, on the flange 30B, and its back surface is hollow along the projecting shape of the front surface. Therefore, by fitting the hollow portion of the back surface to the mounting portion 98A of the mounting plate 98, the nameplate 30 is mounted to the mounting plate 98.

The flange 30B of the nameplate 30 is formed with notches 30b, 30b at its top and bottom positions, and the notches 30b, 30b are fitted to positioning projections 98B, 98B formed on the surface of the mounting plate 98. This allows the nameplate 30 to be mounted upright to a normal position of the mounting plate 98.

The mounting portion 98A of the mounting plate 98 is formed with a pair of through holes 98C, 98C. The nameplate 30 mounted to the mounting plate 98 is secured to the surface of the mounting plate 98 by pouring the adhesive from the back side into the through holes 98C, 98C.

Then, the nameplate 30 mounted to the mounting plate 98 as described above is, as shown in FIG. 4, mounted to the grip portion 68B by fitting the nameplate portion 30A in the nameplate mounting hole 68E formed in the grip portion 68B. At this time, the mounting plate 98 is secured to the inner surface of the grip portion 68B by applying the adhesive to legs 98D, 98D, . . . formed on the four corners of the surface.

The acrylic cover 64 is formed from acrylic and mounted so as to cover the upper portion of the front surface of the front cover 62. The acrylic cover 64 is translucently formed as a whole, and portions covering the finder window 18 and electronic flash 14 are transparently formed.

As described above, the front cover 62 is mounted with the acrylic cover 64, metal cover 66 and grip cover 68, and this integral piece is mounted to the front surface of the camera body 56 and then made integral with the rear cover 60 to constitute the outer cover of the camera 10.

Now, the front surface of the front cover 62 is mounted with the metal cover 66 and grip cover 68, and in such a configuration, a clearance is generated at a joining portion between the metal cover 66 and grip cover 68, and there is a problem of detracting from the appearance of the camera 10.

Thus, in the camera 10 of this embodiment, the joining portion is configured as follows to prevent detracting from the appearance configuration.

Figure 6:
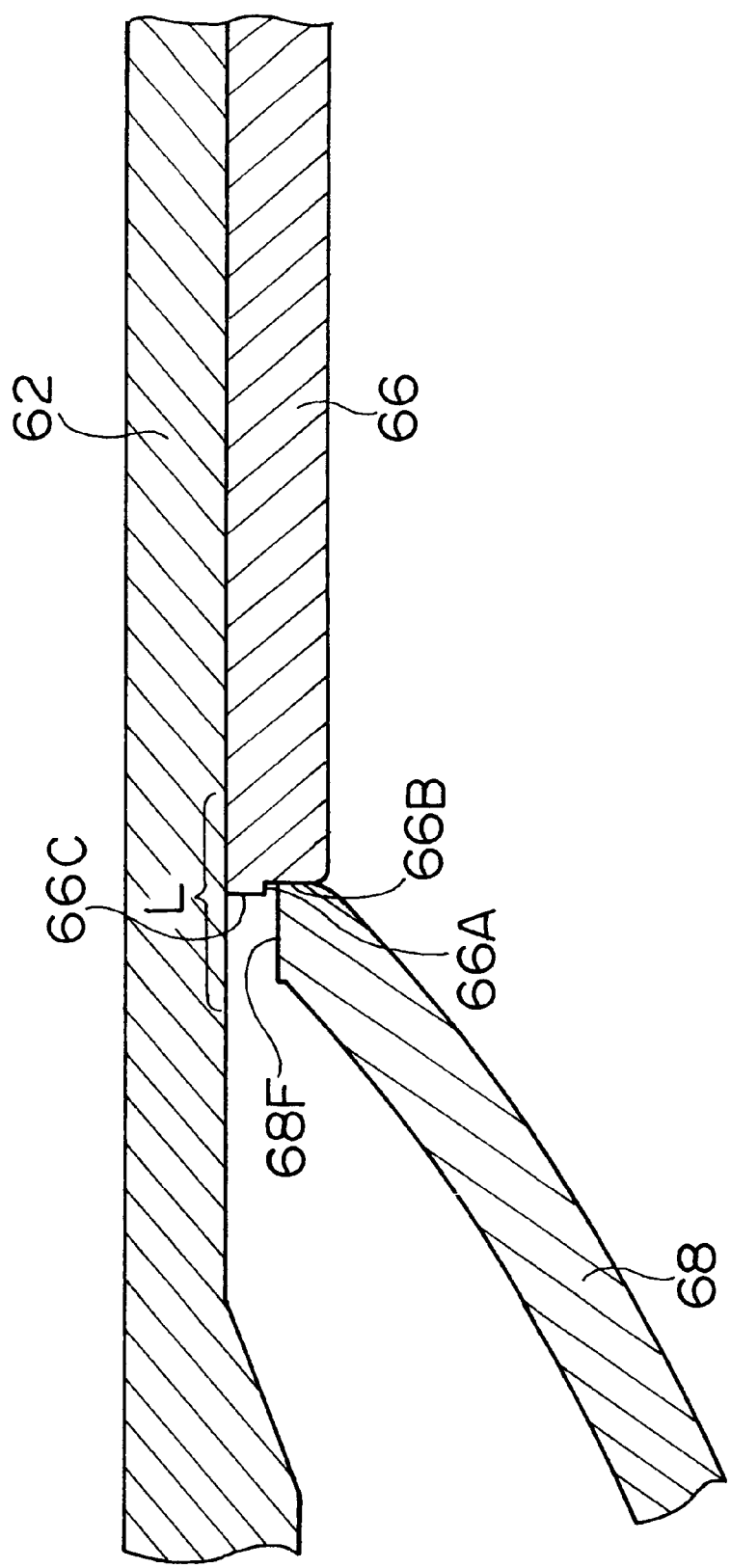
FIG. 6 is a sectional plan view of a configuration of a joining portion between a metal cover and grip cover.

FIG. 6 is a sectional plan view of a configuration of the joining portion between the metal cover 66 and grip cover 68.

As shown in the figure, for the metal cover 66, the joining portion to the grip cover 68 is crushed, and the grip cover 68 is joined so as to be superposed on the crushed portion. That is, the grip cover 68 is joined in such a manner that an end surface of joining portion 68F is superposed on a crushed surface 66A of the metal cover 66.

In this way, by crushing the joining portion of the metal cover 66 and joining the grip cover 68 and metal cover 66 at the portion formed by the crushing, exposure of the surface of the inner front cover 62 due to the generation of the clearance at the joining portion between the metal cover 66 and grip cover 68 can be prevented, and degrading the appearance quality of the camera 10 can be prevented. That is, even when the clearance is generated at the joining portion, the crushed surface 66A of the metal cover 66 is exposed from the clearance by joining the grip cover 68 and metal cover 66 at such a crushed portion, thus the appearance quality of the camera 10 is not degraded.

Figure 7:
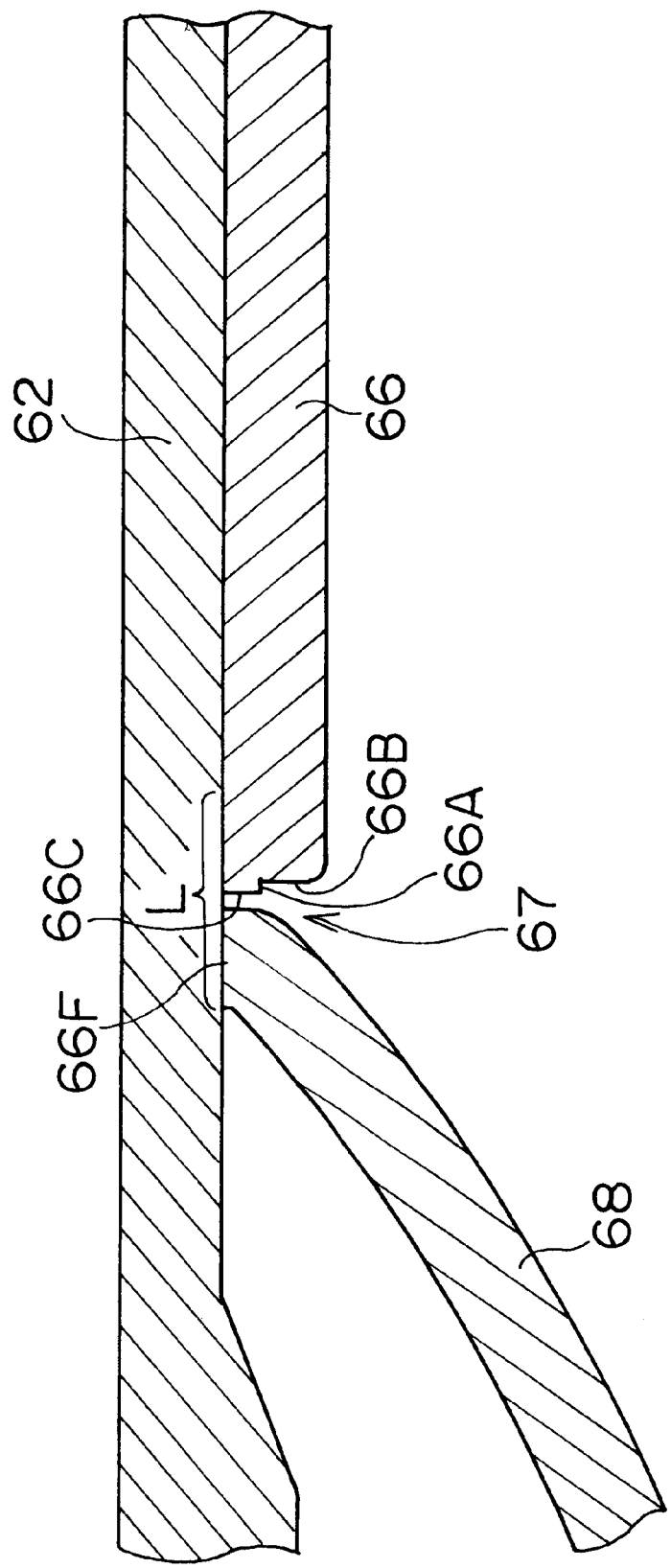
FIG. 7 is a sectional plan view of a configuration of the joining portion between the metal cover and grip cover.

Actually, however, a clearance 67 is sometimes generated at the joining portion between the metal cover 66 and grip cover 68 by errors in manufacture as shown in FIG. 7. A cause of degrading the appearance quality of the camera 10 when the clearance 67 is thus generated at the joining portion is that the surface of the front cover 62 looks reflected from the clearance 67 of the joining portion.

Thus, in the configuration where the front cover 62 is mounted with the metal cover 66 and grip cover 68 as described above, it is effective to mat the surface of the inner front cover 62 to prevent surface reflection from the clearance 67.

Therefore, even when the clearance 67 is generated at the joining portion between the metal cover 66 and grip cover 68 by the errors in manufacture as shown in FIG. 7, the surface of the front cover 62 does not look reflected from the clearance of the joining portion, thus the appearance quality of the camera 10 is not degraded.

Matting can be carried out by graining the surface of the front cover 62 or applying matting paint.

As shown by a range L in FIG. 7, it suffices to mat portions positioned at least inside the joining portion between the metal cover 66 and grip cover 68.

Now, as described above, the metal cover 66 and grip cover 68 are formed from aluminum, and their surfaces are anodized. The anodizing is accomplished by passing a current using the aluminum as an anode in a solution of sulfuric acid or oxalic acid.

The metal cover 66 is anodized after crushing the joining portion. In this way, by anodizing after crushing, the crushed surface 66A and an end surface of stepped portion 66B are also anodized, thus even when the clearance 67 is generated at the joining portion by the errors in manufacture and the crushed surface 66A and the end surface of stepped portion 66B are exposed at the appearance from the clearance 67, the appearance quality of the camera 10 is not degraded.

For the anodized metal cover 66, the crushed surface 66A with a reduced thickness is then cut by pressing with a predetermined width. This is because electrodes are mounted to the crushed surface 66A when anodizing. Since the portion thus mounted with the electrodes is not anodized, the crushed surface 66A is cut by pressing with the predetermined width after anodizing in order to remove the portion which is not anodized.

However, such cutting by pressing causes exposure of a cut surface 66C which is not anodized. When the metal cover 66 is mounted to the front cover 62 in such a condition and the clearance 67 is generated at the joining portion by the errors in manufacture as shown in FIG. 7, the cut surface 66C is exposed at the appearance of the camera 10 from the clearance 67, which causes degrading the appearance quality.

For this reason, the cut surface 66C of the joining portion of the metal cover 66 thus cut by pressing is matted so as not to degrade the appearance quality of the camera 10 even when the cut surface 66C is exposed at the appearance of the camera 10 from the clearance 67 of the joining portion. That is, the matting paint (for example, black ink) is applied to the cut surface 66C of the joining portion of the metal cover 66 cut by pressing.

In this way, even when the clearance 67 is generated at the joining portion between the metal cover 66 and grip cover 68 by the errors in manufacture the cut surface 66C of the metal cover 66 does not look reflected from the clearance 67 of the joining portion by matting the cut surface 66C of the joining portion of the metal cover 66 cut by pressing, thus the appearance quality of the camera 10 is not degraded.

Matting of the cut surface 66C can be carried out by applying the matting paint to the cut surface 66C using a brush or the like, but can be easily and surely carried out by adopting a method of stamping on the cut surface 66C.

Figure 8:
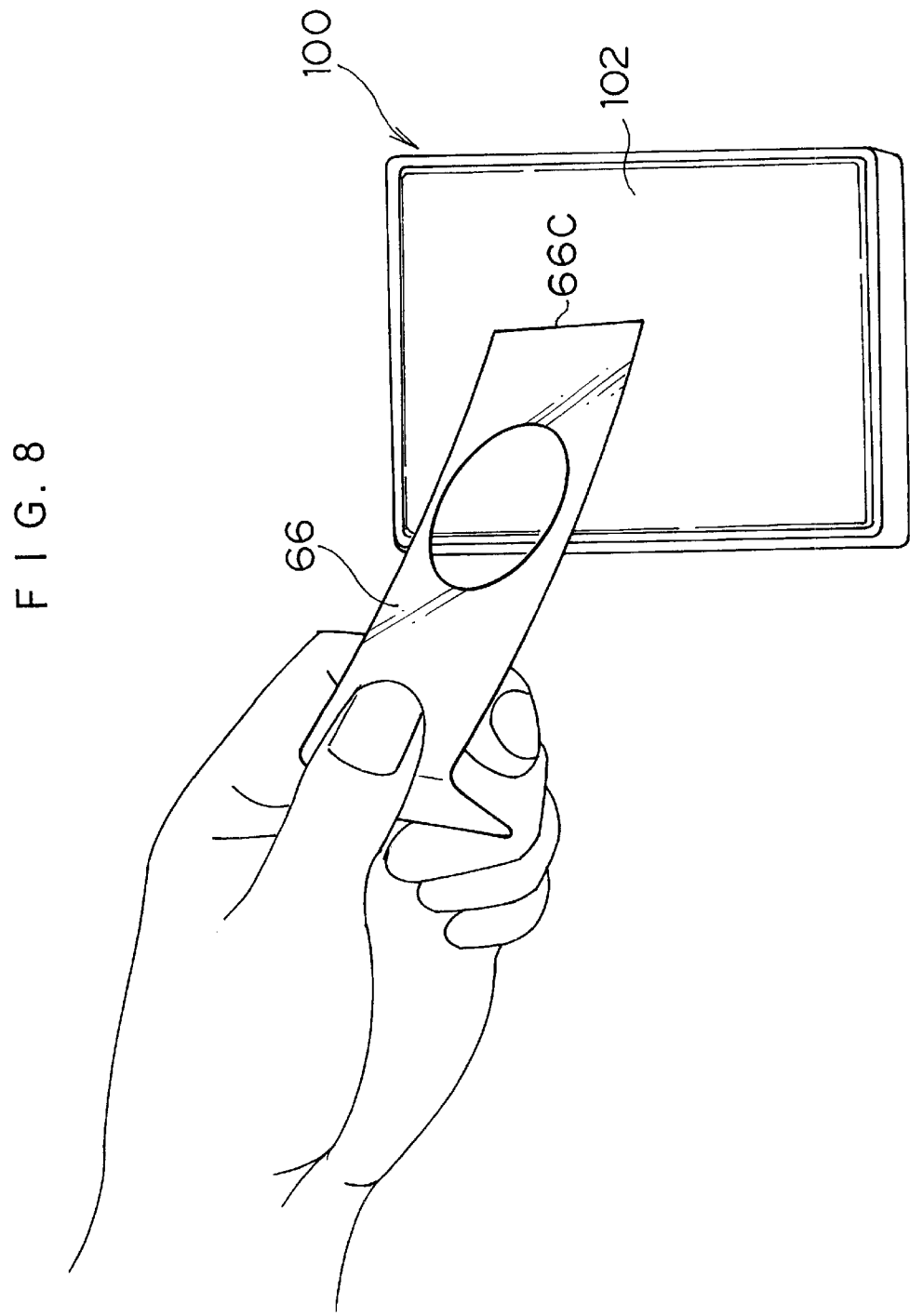
FIG. 8 is an explanatory view of a stamping method.

That is, as shown in FIG. 8, the cut surface 66C of the metal cover 66 is pressed on an inkpad 102 of a stamp pad 100 containing black ink, and the black ink is applied to the cut surface 66C. By this method, the black ink can be easily applied to the cut surface 66C without running over from the cut surface 66C.

As described above, according to the camera 10 of this embodiment, even when the outer cover is constituted by the plurality of covers, generation of the clearance at the joining portion between the covers is prevented, thus the appearance quality of the camera 10 is not degraded.

Further, as shown in FIG. 7, even when the clearance 67 is generated at the joining portion and the cut surface 66C of the metal cover 66 or the surface of the front cover 62 is exposed, the appearance quality is not degraded by the reflection light from the clearance 67 since the surface is matted.

Matting the surfaces of the members inside the joining portion is extremely effective in maintaining the appearance quality not only at the joining portion between the metal covers but also at a joining portion between the metal cover and resin cover, or a joining portion between the resin covers.

Matting the end surface of the joining portion is extremely effective in maintaining the appearance quality, not limited to the case where the end surface of the joining portion is the cut surface of the metal cover.

As described above, according to the camera of the present invention, even when the clearance is generated at the joining portion, exposure of an inner component from the clearance can be prevented. Further, the treated end surface is exposed from the clearance, thus degrading the appearance quality can be prevented.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A camera whose outer cover at least partly comprises a metal cover formed by machining a plate,
   wherein the metal cover is configured in such a manner that a portion which is to be a joining portion to another cover constituting the outer cover is crushed and then surface treated, and that a portion with a thickness reduced by the crushing is cut.

2. The camera according to claim 1, wherein a surface of a member positioned inside the joining portion of each cover constituting the outer cover is matted.

3. The camera according to claim 1, wherein a cut end surface of the metal cover is matted.

4. The camera according to claim 3, wherein a surface of a member positioned inside the joining portion of each cover constituting the outer cover is matted.

5. The camera according to claim 1, wherein a cut end surface of the metal cover is coated with matting paint by stamping.

6. The camera according to claim 5, wherein a surface of a member positioned inside the joining portion of each cover constituting the outer cover is matted.

* * * * *